United States Patent
Kurihara

[15] 3,638,548
[45] Feb. 1, 1972

[54] EXPOSURE METER SYSTEM FOR CAMERAS

[72] Inventor: Makoto Kurihara, Tokyo, Japan
[73] Assignee: Kabushiki Kaisha Ricoh, Tokyo, Japan
[22] Filed: Oct. 21, 1969
[21] Appl. No.: 868,123

[30] Foreign Application Priority Data

Oct. 29, 1968 Japan.................................43/78714

[52] U.S. Cl..................................................95/42, 355/68
[51] Int. Cl. ...........................................................G03l 19/12
[58] Field of Search.............................355/68; 95/42, 10 C

[56] References Cited
UNITED STATES PATENTS
2,794,366  5/1957  Canaday.................................355/68

*Primary Examiner*—Samuel S. Matthews
*Assistant Examiner*—E. M. Bero
*Attorney*—Burgess, Ryan and Hicks

[57] ABSTRACT

A device for measuring the intensity of exposure light by a photometric element placed so as to receive light reflected by a semitransparent reflecting mirror interposed between a hinged mirror of a single-lens reflex camera and a film plane thereof.

1 Claims, 2 Drawing Figures

PATENTED FEB 1 1972

3,638,548

EXPOSURE METER SYSTEM FOR CAMERAS

BACKGROUND OF THE INVENTION

The present invention relates to an exposure meter system for cameras and more particularly to an exposure meter system for single-lens reflex cameras.

In the so-called TTL (Through The Lens) system for single-lens reflex cameras in which the light value or intensity of light is measured after the light has passed through a photolens, the photometry is interrupted when the shutter is actuated so that a memory must be provided in order to eliminate the adverse effect upon photography due to the above interruption. This can be provided by a time delay between the time when the photography is actually made and the time when the light value or the intensity of light is measured for this photography before the hinged mirror is pulled out of the optical path so that the image may fall upon the film plane. However, the provision of the memory, which is substantially of electrical type, is not preferable because of the high costs.

Accordingly, the primary object of the present invention is to provide an exposure meter system for cameras which is simple in construction and less in manufacturing cost and capable of measuring the light value or the intensity of light with a higher degree of accuracy up to the instant of photography.

SUMMARY OF THE INVENTION

According to the present invention, at least one semitransparent reflecting mirror is interposed between a hinged reflecting mirror and a film plane so as to reflect the light passing through a photolens toward a photometric element arranged at a position out of the effective optical path from the photolens to the film plane, whereby the light value or the intensity of light for exposure is measured.

The above and other objects features and advantages of the present invention will become more apparent from the following description of one illustrative embodiment thereof with reference to the accompanying drawing.

DESCRIPTION OF THE PREFERRED EMBODIMENT

Figure 1:
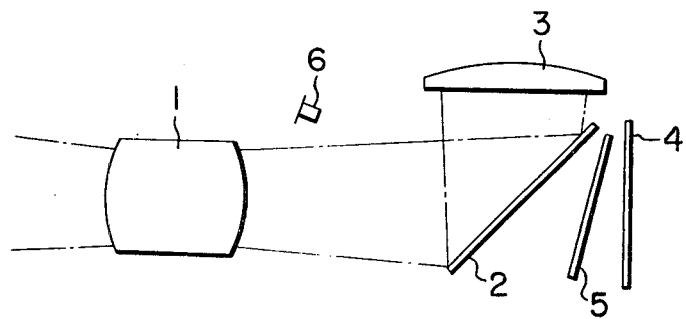
FIG. 1 is a diagrammatic view illustrating one embodiment of the present invention with its hinged mirror is in reflecting position.

Referring to FIG. 1, reference numeral 1 designates a photolens; 2, a hinged mirror; 3, a ground or focusing glass for a finder optical system; and 4, a sensitized material such as film. Further detailed description of their constructions and arrangements will not be made as they are well known in the art of single-lens reflex cameras.

Figure 2:
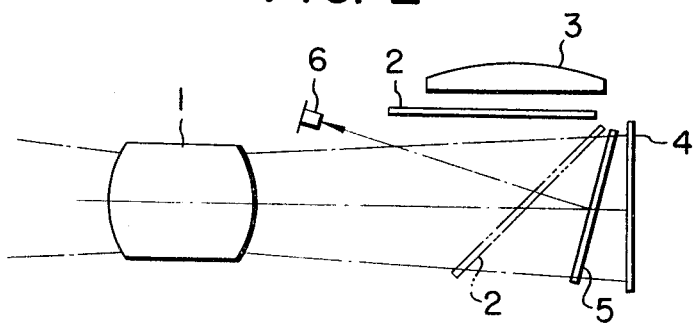
FIG. 2 is a view similar to FIG. 1, but illustrates that the hinged mirror is retracted or lifted.

When the hinged mirror 2 is in the position shown in FIG. 1 before the shutter release button (not shown) is depressed, it reflects the light through the photolens 1 to the ground glass 3 for focusing and composition. When the shutter button is depressed, the aperture diaphragms for the photolens 1 are closed or the shutter blades or diaphragms are closed in case of a lens-shutter system and then the hinged mirror is moved out of the beam path to the position indicated by the solid line in FIG. 2. Thereafter, the shutter mechanism is actuated so that the shutter blades are opened and closed and while the shutter remains open, the image having a suitable intensity of light falls upon the film 4.

In the conventional TTL exposure meter, the intensity of light of a subject to be photographed has been measured until the time when the shutter is closed so that the light value measured by the conventional device will not be a value most suitable at the instant of photography because there will be the variation in the intensity of light between the time when the shutter is closed and the time when the shutter is opened so as to fall the image upon the film.

According to the present invention, a semitransparent reflecting mirror 5 having an area sufficient enough to cover the whole path of the incident light from the photolens 1 to the film 4 is interposed between the hinged mirror 2 and the film 4 in inclined relation with respect to the optical axis. A photometric element 6 such as a CdS element is fixed to a stationary portion of the camera at a position backwardly of the photolens 1 and out of the path of the incident light through the lens 1 upon the film 4, so that when the hinged mirror 2 is moved out of the beam to the position indicated by the solid line in FIG. 2, some of the incident light beams reflected by the semitransparent reflecting mirror 5 may be incident upon the photometric element 6, thereby measuring the intensity of the light. Thus it will be understood that the photometry is being made even at the instant of photography so that the optimum exposure may be attained especially in case of a full automatic camera whose exposure is based upon the integrated light value.

The semitransparent reflecting mirror 5 which has been described in the instant embodiment as being interposed so as to cover the whole optical path of light through the photolens 1 to the film 4, may be so arranged as to extend only one portion thereof into the optical path or to be positioned very closely to the optical path. Alternately, one portion of a transparent plate covering the whole optical path may be used as a semitransparent reflecting mirror 5. The photometric element, whose number is not limited to one, may be positioned downwardly or laterally of the optical path when the inclination of the semitransparent reflecting mirror with respect to the optical axis is suitably adjusted.

To sum up, according to the present invention the semitransparent reflecting mirror is interposed between the hinged reflecting mirror and the film plane in a single-lens reflex camera so as to cover the optical path of the light through the photolens to the film plane. Some of the incident light reflected is made incident upon the photometric element so that the correct and optimum light value may be measured even at the instant of photography. Thus the exposure meter system in accordance with the present invention is simple in construction yet ensures the optimum photography, eliminating the defects encountered in the conventional device.

I claim:

1. An exposure meter system for a single-lens reflex camera having an optical path for light to pass therethrough for defining an image on a film therein comprising a photolens positioned in said optical path to direct the light onto the film spaced therefrom;

a focusing glass for a finder optical system having a generally planar surface and positioned between said photolens and the film in the area closer to the film than said photolens, said focusing glass spaced laterally from said optical path between said photolens and the film;

a hinged mirror positioned in the optical path between said photolens and the film, said hinged mirror located in a first position inclined with respect to the optical path to reflect light passing through said photolens in a generally perpendicular manner thereto to pass through said focusing glass, said hinged mirror pivotal to a second position out of the direct path of light passing through said photolens, said hinged mirror in said second position being spaced laterally from the optical path between said photolens and the film, said hinged mirror in said second position being adjacent to and substantially parallel to said planar surface of said focusing glass;

a semitransparent reflecting mirror fixed in position in the optical path between said hinged mirror and the film, said fixed mirror having an inclination less than said hinged mirror;

a photometric element fixed within said camera and positioned between said photolens and the film in the area closer to said photolens than the film, said photometric element spaced laterally from the optical path, said lateral spacing of said photometric element from the optical path being less than said lateral spacing of said hinged mirror in said second position to allow said photometric element to view the light incident on said semitransparent reflecting mirror when said hinged mirror is in said second position.

* * * * *